Sept. 4, 1956        J. O. REED        2,761,446
IMPLANTER AND CARTRIDGE
Filed March 30, 1955
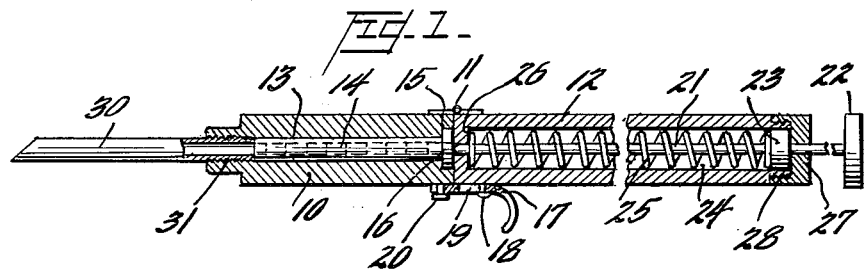
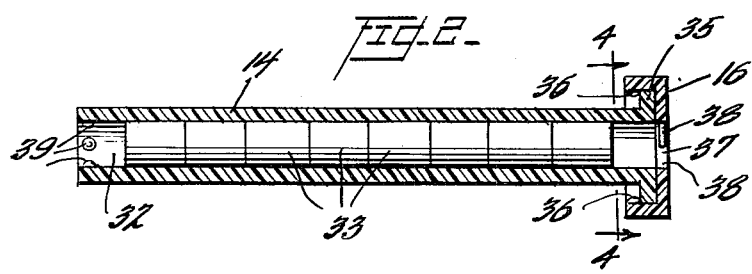
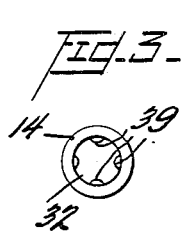 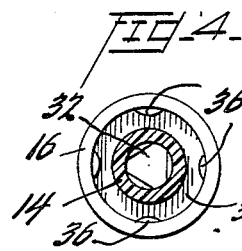 
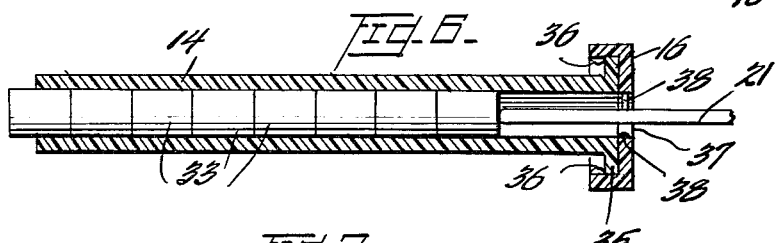
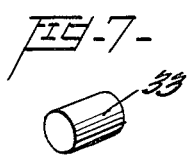
INVENTOR
*Jack O. Reed,*
BY *Leon Simon*
ATTORNEY

United States Patent Office 2,761,446
Patented Sept. 4, 1956

2,761,446

IMPLANTER AND CARTRIDGE

Jack O. Reed, Mission, Kans., assignor to Chemical Specialties Co., Inc., New York, N. Y., a corporation of New Jersey Application March 30, 1955, Serial No. 497,974

2 Claims. (Cl. 128—217)

The present invention relates to an implanter and cartridge therefor.

More particularly, the present invention relates to an implanter especially adapted for subcutaneous implantation of regulated dosages of hormones or other medicinals in animals especially in order to promote the growth thereof.

It has recently been discovered that the administration of various hormones to animals is a great aid to fattening and to otherwise regulating the growth of the animals. Prior to this invention, however, no means have been provided for inserting suitable implants of hormones under the skin of the animal so as to form a depot supplying these hormones to the system thereof.

It is one of the objects of the present invention therefore, to provide a novel and effective implanter having a hollow point and arranged to receive a cartridge containing a regulated quantity of hormones or the like together with a means for ejecting from the interior of such cartridge the pellets of material contained therein.

A further object of the present invention is to provide a novel cartridge which may be readily inserted and removed from an implanter of the type described, said cartridge being adapted to contain a number of pellets and to prevent accidental displacement of such pellets from the cartridge.

A third object of the present invention is to provide a novel implanter consisting of a barrel, a tip adapted to be removed from the barrel and having a sharpened point, and a bore within the barrel adapted to receive a cartridge and an ejector member adapted to be slidably projected through the cartridge in order to project pellets therefrom and from the implanter.

Other objects and advantages of the present invention will become apparent from the subsequent description and figures of the drawing wherein:

Fig. 1 is a section of the implanter having a cartridge in place therein.

Fig. 2 is an enlarged section of the cartridge showing hormone pellets positioned therein.

Fig. 3 is an end view of the cartridge of Fig. 2.

Fig. 4 is a section taken generally along the line 4—4 of Fig. 2.

Fig. 5 is an end view of the other end of the cartridge.

Fig. 6 is a section of the cartridge similar to Fig. 2 except that the pellets therein are being ejected therefrom, and Fig. 7 is a perspective view of a hormone pellet.

Referring to the figures of the drawing and particularly to Fig. 1, the barrel of the implanter is indicated at 10. The barrel 10 is hinged as at 11 to a rear section 12. As may be understood, both the barrel 10 and the rear section 12 are cylindrical in nature. The barrel 10 is provided with a central bore 13 adapted to receive a cartridge 14. As indicated, the bore 13 is enlarged at 15 to receive the cap or closure member 16 for the cartridge 14.

In addition to the hinge 11, the two sections of the implanter 10 and 12 are also connected by a sliding latch member 17 supported on the section 12 as by the pin 18 received in a slot 19 in the latch member 17 and having a forked end extending about a second pin 20. Positioned within the section 12 is a piston or ejection member 21 having a push button 22 at the rear end thereof and a disk or piston member 23 fixed thereon intermediate the ends thereof. The ejector is located within the bore 24 of the rear section 12, and a spring is wound about the ejector 21 and has one end bearing against the left-hand end 26 of the bore 24 and the other end bearing against the piston or disk 23. The piston or disk 23 in turn is forced against a cap 27 held on the end of the section 12 as by the threads 28. As shown therefore, the ejector 21 is held in a retracted position by the action of the spring 25.

The end of the barrel 10 is provided with a hollow needle 30 threaded into the end of the barrel 10 as by the threads 31. As best shown in Fig. 2 the cartridge 14, which is formed of semi-flexible plastic such as polyethylene, is formed with a bore 32 of a size to receive a plurality of cylindrical pellets 33. The pellets may consist, for example, of a mixture of progesterone and estradiol, a typical dosage form for lamb fattening containing a total of 250 mg. of progesterone and 10 mg. of estradiol divided into eight pellets. The pellets as may be understood are formed on a conventional pellet forming machine and contain in addition to the hormone the usual binding and filling materials.

The cartridge 14 is formed with a lip 35 so that the cover 16 also made of polyethylene may be retained in place by the cooperation of the lip 35 and the projections 36 on the cover 16. This permits ready filling of the cartridge 14 with pellets 33 on removal of the cap 16. The cap is provided with a bore 37 of approximately the diameter of the ejector 21 so that the ejector may be advanced through the bore 37 to eject pellets as shown in Fig. 6. Small flexible ridges 38 are provided on the circumference of the bore 37 which are flexible enough to permit passage of the ejector 21 but prevent passage of the pellets 14. Projections 39 are also provided at the end of bore 32 which prevent accidental displacement of the pellets 14 but of sufficient flexibility to permit forceful passage of the pellets and ejector 21.

In the use of the implanter the needle 30 is forced just beneath the skin of a lamb at the underside of the lamb's jaw. The button 22 is then forced inwardly until it contacts the cap 27. This action causes the ejector to be forced through the cartridge 13 and the needle 30 expelling all of pellets 33 through the needle. With the ejector still in forward position the implanter needle is then withdrawn to leave the pellets. After withdrawal, the latch 17 is moved rearwardly and implanter opened on the hinge 11. The cartridge 14 may then be removed and a new loaded cartridge is inserted.

I claim:

1. An implanter comprising a hollow needle member, a cartridge receiving member communicating with the interior of the needle member, a cartridge having pellets therein positioned in said member, flexible means at each end of said cartridge to prevent displacement of the pellets therefrom and a movable ejector member of a length to extend through said cartridge and needle member, said ejector member being positioned on said implanter adjacent and in alignment with said cartridge receiving member.

2. A cartridge for medicinal pellets comprising a cylindrical member having a central bore of a size to receive a plurality of pellets, flexible projections extending from the wall of said bore at one end thereof of a size to prevent accidental displacement of said pellets from said bore and allow forcible displacement therefrom, a circumferential lip extending from the other end of said cartridge, a cap member displaceably fitted over said lip and having a second bore of substantially the size of the first bore and flexible means extending from the wall of the second bore of a size to prevent accidental displacement of the pellets therethrough.

References Cited in the file of this patent

UNITED STATES PATENTS

| | | |
|---|---|---|
| 2,513,014 | Fields | June 27, 1950 |
| 2,718,299 | Atwater | Sept. 20, 1955 |